Figure 1:
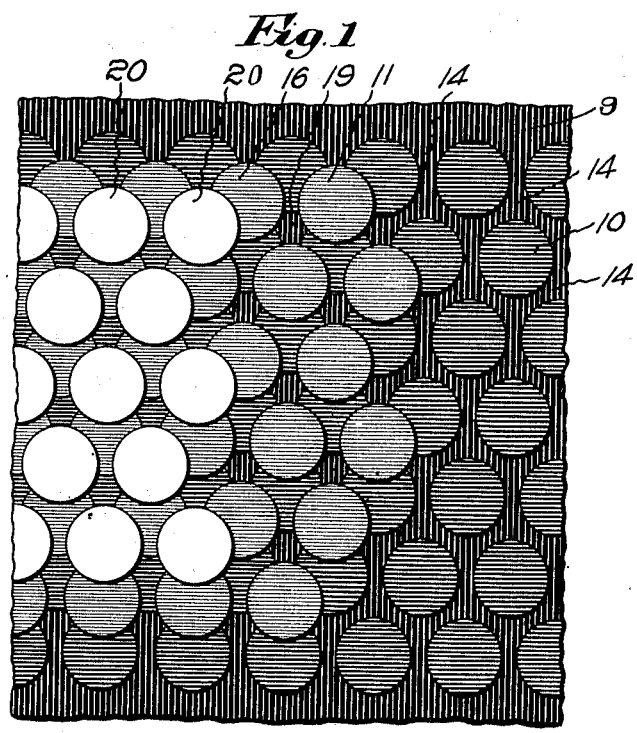

C. S. BARRELL.
ARMOR FOR VEHICLE TIRES.
APPLICATION FILED NOV. 25, 1904.

953,000.

Patented Mar. 22, 1910.
3 SHEETS—SHEET 1.

Witnesses:
Horace H. Crossman
Robert H. Kammler.

Inventor:
Charles S. Barrell.
by Emery & Booth
Attys.

C. S. BARRELL.
ARMOR FOR VEHICLE TIRES.
APPLICATION FILED NOV. 25, 1904.
953,000.
Patented Mar. 22, 1910.
3 SHEETS—SHEET 2.
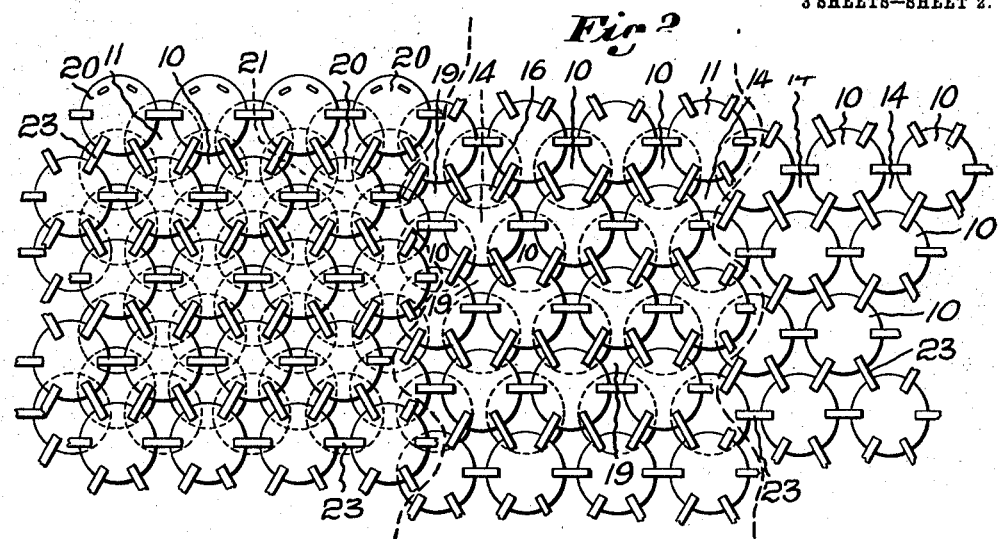
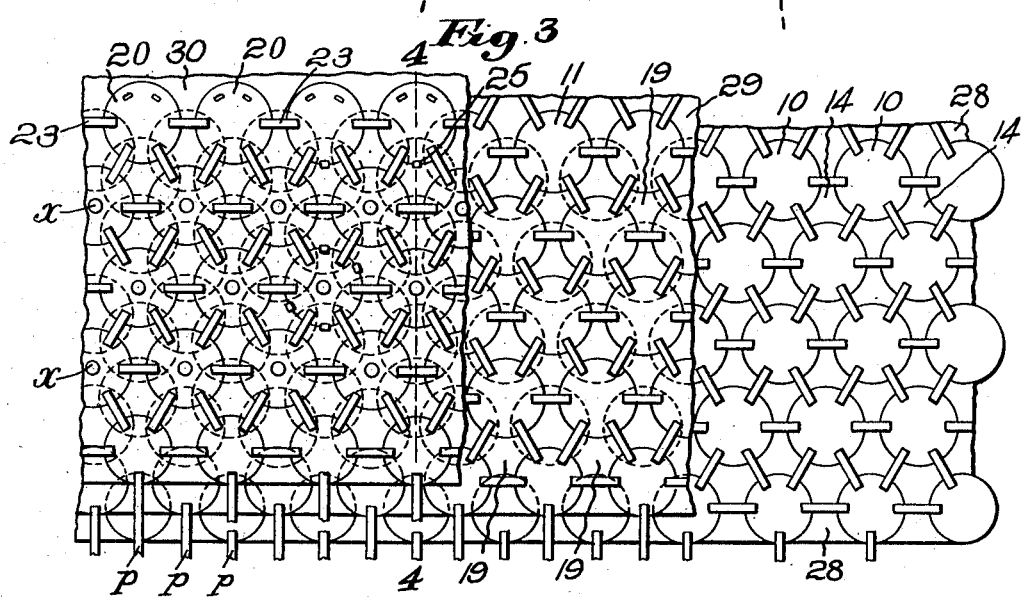
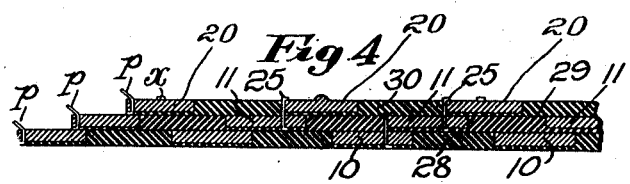
Witnesses:
Horace H. Crossman
Robert H. Kammler.
Inventor:
Charles S Barrell
by Emery & Booth Attys

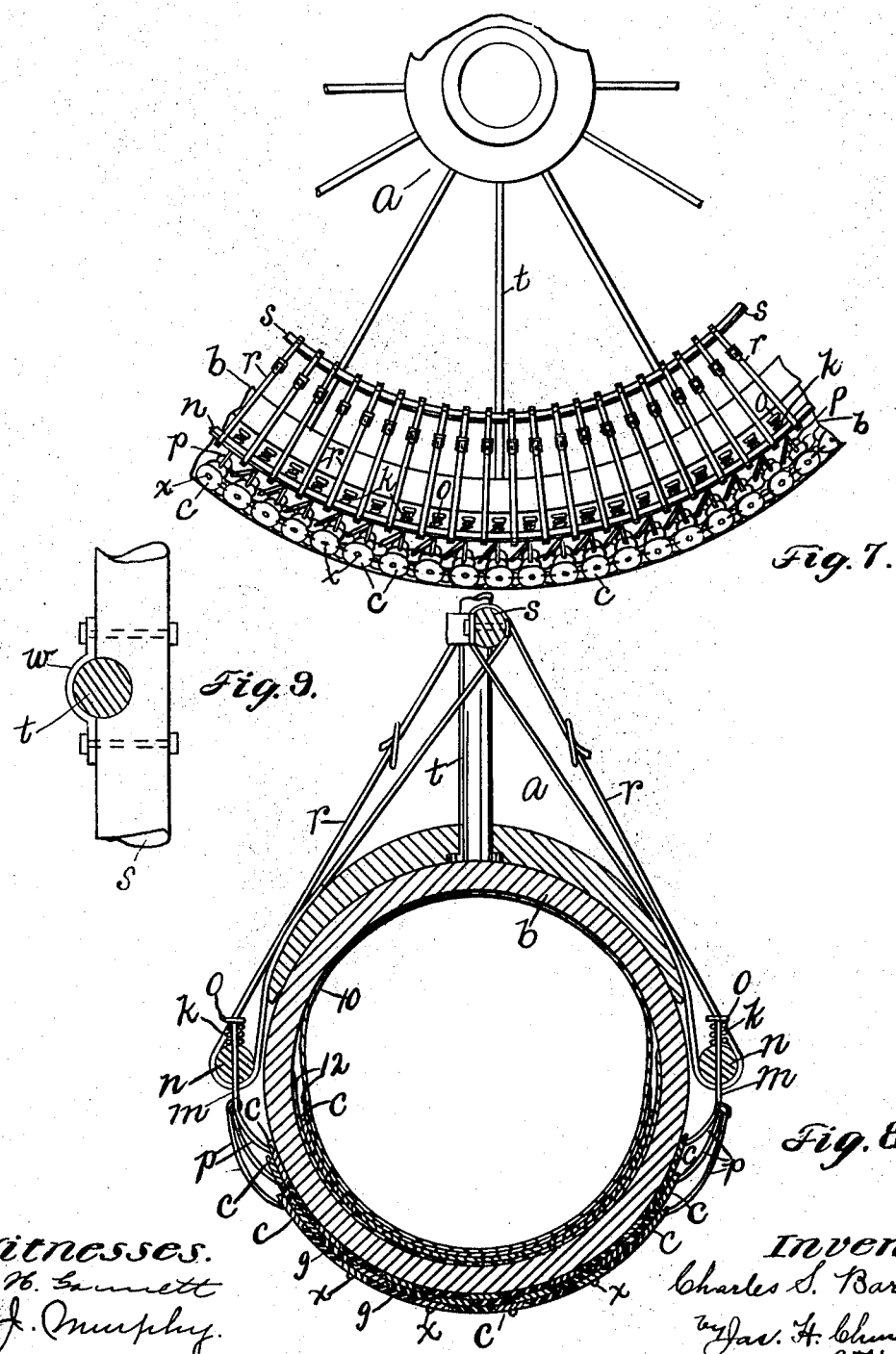

UNITED STATES PATENT OFFICE.

CHARLES S. BARRELL, OF BOSTON, MASSACHUSETTS, ASSIGNOR TO BARRELL HOLDING & MANUFACTURING COMPANY, OF PORTLAND, MAINE, A CORPORATION OF MAINE.

ARMOR FOR VEHICLE-TIRES.

953,000.  Specification of Letters Patent.  Patented Mar. 22, 1910.

Application filed November 25, 1904. Serial No. 234,111.

*To all whom it may concern:*

Be it known that I, CHARLES S. BARRELL, a citizen of the United States, residing in Boston, in the county of Suffolk and State of Massachusetts, have invented an Improvement in Armor for Vehicle-Tires, of which the following description, in connection with the accompanying drawings, is a specification, like numerals on the drawings representing like parts.

This invention relates to protective puncture-resisting means, intended to be interposed at some point between the air chamber of a pneumatic tire and the roadway.

More particularly, the invention pertains to the organization and arrangement of a protective armor which may be associated with the tire in any practicable manner.

The character of the invention may be best understood by reference to one embodiment selected for illustration and shown in the accompanying drawings, in which,—

Figure 1 is a diagrammatic plan view of tire armor illustrating the manner of assembling puncture-resisting bodies; Fig. 2 is a plan view of three layers of armor elements, the second and third layers being partially broken away to show the preferred relative positions of armor elements of the different layers; Fig. 3, a plan view similar to that of Fig. 1, showing a like arrangement of armor elements associated with or embedded in an enveloping material, such as rubber or rubber composition; Fig. 4 is a section on the line 4—4 of Fig. 3; Fig. 5 is an enlarged sectional view of a puncture-resisting armor element, in a modified form of seat; Fig. 6 is a view similar to that of Fig. 4, showing a modified form of armor element, countersunk in a practicable form of seat; Fig. 7 is a side elevation of a part of a vehicle wheel, provided with an illustrative form of armor embodying the invention, such as is shown in Figs. 1 and 2; Fig. 8 is a transverse section of a vehicle wheel, showing two practicable modes of using a protective armor embodying this invention; and Fig. 9 is a detail view hereinafter explained.

Referring now to Fig. 1, the illustrative protective armor may comprise a plurality of puncture-resisting bodies, such as disks 10, 11 and 20. The shape and material of the puncture-resisting bodies 10, 11 and 20 are immaterial so long as they are are adapted properly to perform their intended offices. Preferably, they are puncture-resisting, as by being made of steel or other metal. They may be of leather or other suitable material, of circular or other shape; and they are preferably substantially flat, and of small dimensions.

The preferred relative positions of puncture-resisting bodies are illustrated in Fig. 1. This figure illustrates diagrammatically the best relative arrangement of disks and shows them in superposition upon a layer 9 of rubber. As presently described, other layers of rubber may be employed. The preferred form of armor comprises three layers of plates or disks. The plates 10, 10, of the innermost layer, may be arranged in parallel rows; and the plates in each such row may be positioned opposite intervals between adjacent plates of the neighboring rows. Thus, between the plates 10, 10 space 14, 14 will intervene. In a second layer the plates, having preferably the same relation to each other as those of the first layer, are positioned to cover more or less the spaces intervening between plates in the first layer. For example, the disk 16 of the second layer (see the top of Fig. 1) is superposed above a space 14 intervening between three plates 10 of the first layer. In this manner the association of the first and second layers of plates partially completes the continuity of a puncture-resisting shield; but there may still remain uncovered spaces 19, between plates of the first layer which coincide with spaces between those of the second layer. To cover these remaining spaces, a third layer of plates may be employed, and they have preferably the same interrelations as those of the other two layers. For instance, a plate 20 of the third layer covers an interval which extends through both the first and second layers.

When assembled as just described, the preferred form of armor comprises a plurality of layers of puncture-resisting bodies providing collectively a completely imperforate shield, such that no aperture remains through which even the most minute pin or tack could be projected. In this connection, it is preferred that the plates of the respective layers have the staggered relation to each other already referred to—*i. e.* that they be arranged in rows, the individual plates of each row being positioned opposite the intervals between plates of the neighboring row or rows. In this manner a part of each disk may project more or less toward or into a space between adjacent disks of a neighboring row, thereby more or less restricting the space. This correlation of disks in a layer may serve to minimize the intervening uncovered spaces to be protected by plates of the other layers.

An armor such as is illustrated in Fig. 1 may be employed in any practicable position between the inner air chamber of a tire and the roadbed. For example, such an armor may be placed upon the exterior of a tire, as illustrated in Fig. 7; and in such case (and, if desired, in other cases also) the individual plates or disks may be connected to hold them in suitable relation, as being flexibly connected by means of links 23—23 (Figs. 2 and 3) which may be of metal; and one or more layers of such linked plates may be used in any practicable manner. Also, if desired, different layers of plates may be connected so as to tie the layers together, as by being flexibly connected by links 25, shown in Figs. 3 and 4 and hereinafter referred to.

Fig. 1 illustrates the preferred relative position of the armor elements; and, while these may be used in the form shown in Figs. 2 and 7, it is preferred that the plates or other bodies be assembled in a more or less unitary form, as by being incorporated in some sort of flexible material, such as rubber or a composition thereof, serving to preserve said bodies in proper relationship. For instance, the layers of plates may be severally assembled with layers of rubber, as illustrated in Figs. 3 and 4. As there shown, disks 10, 10 of the lower layer may be countersunk in a layer of rubber 28; the plates 11, 11 of the second layer may be countersunk in a layer 29 of rubber; and, the plates 20, 20 of the third layer may be countersunk in a layer 30 of rubber. Preferably, the layers of rubber are thicker than the individual plates so that the latter, when seated in the rubber, will extend only partly through the latter, leaving a cushioning web for the disk to rest against. Thus, one face of each layer of combined disks and rubber may present, to the next adjacent layer, a continuous cushion face, if desired, to separate the adjacent layers resiliently. Also, it is preferred that some of the rubber or other flexible material intervene between the individual disks of each layer. Thus, as illustrated in Fig. 4, each plate may be completely surrounded by cushioning material, and this is the preferred arrangement, since it permits the metallic elements of the armor to be assembled in a substantially unitary whole, which is nevertheless freely flexible and resilient. Such an arrangement provides an armor which detracts very little, if any, from the normal resiliency of the tire.

The plates, disks or other puncture-resisting bodies may be seated in the cushioning material in any practicable manner. For instance, a seat for a disk may consist merely of a shouldered aperture in the rubber 31 shown in Fig. 5. Also, as illustrated in Fig. 6, the plates themselves may be shouldered and seated in any practicable manner in the cushioning material.

As will appear to those skilled in the art, the cushioning of the individual puncture-resisting bodies, one from another, is superior to an arrangement wherein metallic or other disks or bodies are in actual contact, as by overlapping one another, or being superposed one upon another, without an intervening cushion.

The preferred arrangement of plates already described presents a further considerable advantage, in that said plates are all positioned flatwise in relation to the tire—that is to say, each plate has its outer face substantially parallel to the adjacent exterior surface of the tire. To express it another way; the plates are preferably so disposed that a radius of the tire is substantially normal to the outer face of a plate. In this respect the embodiment of the invention shown in the drawings, is vitally different from and greatly superior to certain types of armor heretofore proposed for use, which comprise a series of plates angularly overlapping each other in succession, after the manner of fish scales. Having such a scale arrangement, the individual scales occupy an angular relation to the tread surface of the tire and therefore present angles or corners, in some cases extending both inwardly and outwardly, which, if the scale be covered or backed by rubber or other material, tend to cut the latter. Also, with a fish scale or equivalent arrangement successive plates, lying in different planes and overlapping each other, are usually in immediate contact one with another, so that in the flexing of the tire each supplies a more or less rigid fulcrum upon which another has a lever motion, tending to tear or injuriously stretch a surrounding body of rubber or other material if such be used. When, however, as contemplated in the preferred embodiment of this invention, the puncture-resisting bodies are disposed substantially flatwise, so that those on the extreme tread of the tire are presented practically parallel to the roadway, the entire outer face of the plate, especially if it be of small area, receives substantially uniform pressure from the road; consequently, such wear as it may cause in its enveloping medium is evenly distributed and the wearing action is minimized. Also, the arrangement of plates flatwise permits them to be assembled all in the same plane, and to be seated side by side, spaced apart if desired, in a single layer of rubber or the like; whereas plates having a scale relation could not be so readily seated because even in the same layer they lie in different planes. If desired, individual puncture-resisting bodies in the armor may differ in size, as by having some larger than others—for instance, the plates or other bodies at the center of the armor, near the crown of the tire, may be the largest, and the sizes may diminish toward the sides, as represented in Fig. 3.

Referring now to Figs. 7 and 8, a wheel $a$ is there shown provided with a pneumatic tire $b$. The protective means for the tire $b$ may comprise plates $c$, $c$ like the plates 10, 11, and 20 of Figs. 1 and 2, preferably assembled either without rubber, as shown in Fig. 7, or with rubber as shown in Figs. 3 and 8. Fig. 8 shows two illustrative ways of assembling an armor with a tire, i. e. either as an external armor, overlying the tread of the shoe, or as an internal armor or "insert," interposed between the inner tube and the shoe.

When the armor is used as an adjunct on the outside of the tire, it is preferably held in place resiliently, so as to conform readily to flexing of the tire; and this may be done as by means of springs $k$ (Fig. 8) or their equivalents, which may encircle rods $m$ passing through rings $n$ at opposite sides of the tire. The springs $k$ may be interposed between the rings $n$ and the heads $o$ on the rods $m$. The latter may be connected to the body of the armor in any practicable manner, as by means of links $p$ connected to the extreme lateral puncture-resisting bodies or other part of the armor proper. If desired, the rings $n$ may be connected by straps or other practicable means with a ring $s$, secured to the spokes $t$ of the wheel as by clamps $w$ shown in Fig. 9. By means of the straps $r$ the armor may be held snugly on the tire and the springs $k$ so compressed as to place the armor more or less under tension, to cause the same to respond readily and completely to the flexing of the tire in use and to partial collapse of the tire. That is to say, the springs $k$ may serve automatically to take up the slack in the armor, if any occurs.

As illustrated in Figs. 3, 7 and 8, some or all of the external puncture-resisting bodies on the armor may be provided with lugs or projections $x$, $x$, capable of being embedded more or less in the road, to prevent slipping and skidding.

A practical and efficient use of the armor, also illustrated in Fig. 8, consists in placing the same between the inner tube and shoe or outer tube of the tire, and if desired the armor so located may be cemented or otherwise attached, either to the inner tube or to the shoe. Layers of canvas 12 (Fig. 8) or other material, as for reinforcing, may lie adjacent the inner or outer face, or both, of the armor and may be secured thereto or incorporated therewith.

It is to be understood, of course, that the invention is by no means essentially limited to the details of construction and organization specifically described above for purposes of explanation. On the contrary, the described embodiment may be variously modified. It is by no means indispensable that all the features of the invention be used conjointly, since they may be used to advantage separately, in various combinations and subcombinations, all within the proper scope of the invention as defined in the subjoined claims.

Claims.

1. The combination with a vehicle wheel provided with a pneumatic tire, of an external armor for said tire composed of a plurality of layers of plates linked together, and means to secure said armor to said wheel, substantially as described.

2. An armor of the class described, composed of a plurality of superimposed layers, each composed of a series of plates, and means connecting the plates of each layer, the plates of one layer being staggered with relation to the plates of another layer and overlapping the same, substantially as described.

3. An armor of the class described, composed of a plurality of superimposed layers, each composed of a series of plates, and links connecting the plates of each layer, the plates of one layer being staggered with relation to the plates of another layer, substantially as described.

4. An armor of the class described, composed of a plurality of superimposed layers, each composed of a series of plates, links connecting the plates of each layer, the plates of one layer being staggered with relation to the plates of another layer, and links connecting the plates of one layer with the plates of another layer, substantially as described.

5. An armor of the class described, composed of a sheet of rubber having holes, plates inserted into said holes, and links connecting said plates, substantially as described.

6. An armor of the class described, composed of a plurality of superimposed layers, each composed of a series of plates and means connecting the plates of each layer, the plates of an intermediate layer being staggered with relation to the plates of the layers on opposite sides thereof, substantially as described.

7. In a protective member for pneumatic tires, the combination with a plurality of layers of rubber, of non-puncturable bodies embedded within the rubber layers, the bodies of one layer overlapping the bodies of an adjacent layer to cover the spaces therebetween.

8. Protective means for pneumatic tires comprising, in combination, a plurality of layers of puncture-resisting bodies arranged with the bodies of an intermediate layer staggered with relation to the bodies of an upper and a lower layer to form a substantially imperforate shield; and flexible means to preserve said bodies in proper relationship.

9. Protective means for pneumatic tires comprising, in combination, a plurality of layers of puncture-resisting bodies arranged with the bodies of an intermediate layer staggered with relation to the bodies of an upper and a lower layer to form a substantially imperforate shield; and relatively flexible metallic means connecting bodies of a layer one with another.

10. Protective means for pneumatic tires comprising, in combination, a plurality of substantially flat circular disks placed flatwise relative to the outer surface of the tire at different radial distances therefrom, the intervals between the innermost disks being completely covered radially by disks nearer the tread.

11. Protective means for pneumatic tires comprising, in combination, a plurality of substantially circular disks placed at different radial distances from the exterior of the tire, the intervals between the innermost disks being completely covered radially by disks nearer the exterior of the tire, each disk being separated from neighboring disks by flexible material.

12. Protective means for pneumatic tires comprising, in combination, a layer of non-puncturable bodies separated from each other; a second layer of separated non-puncturable bodies positioned individually over intervals between bodies in the first layer; a third layer of separated non-puncturable bodies positioned over intervals remaining between the bodies of the first and second layers; and flexible means holding said bodies in their described relationship.

13. Protective means for pneumatic tires comprising, in combination, a layer of non-puncturable bodies separated from each other and arranged in parallel rows, the individual bodies of one row standing respectively opposite intervals between adjacent bodies in the next row; a second layer of non-puncturable bodies similarly arranged, the individual bodies being disposed over intervals between the bodies of the first layer; a third layer of similarly arranged non-puncturable bodies, the individual bodies being disposed over intervals remaining between the bodies of the first and second layers; and flexible material holding said bodies in their described relationship.

14. Protective means for pneumatic tires comprising, in combination, a layer of substantially rounded plates positioned side by side flatwise relative to the outer surface of the tire and arranged in parallel rows, the individual plates of one row standing respectively opposite intervals between adjacent plates in a neighboring row; and a second layer of similarly arranged substantially rounded plates, the individual plates being disposed over intervals between those of the first layer; a third layer of similarly arranged substantially rounded plates, the individual plates being disposed over intervals remaining between those of the first and second layers; and means holding said bodies in their described relationship.

15. Protective means for pneumatic tires comprising, in combination, a plurality of layers of rubber; and puncture-resisting bodies embedded in said rubber layers, the puncture-resisting bodies of an intermediate layer being staggered with relation to the bodies of an upper and a lower layer to form a substantially imperforate shield, said bodies being separated and cushioned from each other by intervening rubber.

In testimony whereof, I have signed my name to this specification in the presence of two subscribing witnesses.

CHARLES S. BARRELL.

Witnesses:
JAS. H. CHURCHILL,
J. MURPHY.